United States Patent
Emerson, III (10) Patent No.: US 6,697,357 B2
(45) Date of Patent: Feb. 24, 2004

(54) CALL MANAGEMENT MESSAGING SYSTEM FOR INTEGRATING THE INTERNET WITH THE PUBLIC SWITCHED TELEPHONE NETWORK

(76) Inventor: Harry E. Emerson, III, 27 Garden Ct., Succasunna, NJ (US) 07876

( * ) Notice: Subject to any disclaimer, the term of this patent is extended or adjusted under 35 U.S.C. 154(b) by 0 days.

(21) Appl. No.: 10/195,241

(22) Filed: Jul. 15, 2002

(65) Prior Publication Data

US 2003/0031169 A1 Feb. 13, 2003

Related U.S. Application Data (60) Provisional application No. 60/311,401, filed on Aug. 10, 2001.

(51) Int. Cl.$^7$ ............................................. H04L 12/66
(52) U.S. Cl. ..................... 370/352; 370/400; 379/58.17
(58) Field of Search ................................ 370/352–356, 370/400, 401, 389, 237; 379/88.17; 709/200

(56) References Cited

U.S. PATENT DOCUMENTS

| | | | |
|---|---|---|---|
| 5,724,412 A | 3/1998 | Srinivasan | 379/93.23 |
| 5,805,587 A | 9/1998 | Norris et al. | 370/352 |
| 5,907,547 A | 5/1999 | Foladare et al. | 370/352 |
| 5,937,041 A | 8/1999 | Cardillo, IV et al. | 379/93.25 |
| 5,995,606 A | 11/1999 | Civanlar et al. | 379/201 |
| 6,031,904 A | 2/2000 | An et al. | 379/201 |
| 6,061,347 A | 5/2000 | Hollatz et al. | 370/352 |
| 6,064,653 A * | 5/2000 | Farris | 370/237 |
| 6,069,890 A * | 5/2000 | White et al. | 370/352 |
| 6,157,648 A | 12/2000 | Voit et al. | 370/401 |
| 6,185,194 B1 | 2/2001 | Musk et al. | 370/260 |
| 6,192,045 B1 | 2/2001 | Williams et al. | 370/352 |
| 6,243,373 B1 | 6/2001 | Turock | 370/352 |
| 6,278,704 B1 | 8/2001 | Creamer et al. | 370/352 |
| 6,292,480 B1 | 9/2001 | May | 370/352 |
| 6,307,930 B1 | 10/2001 | Mayer | 379/215.01 |
| 6,324,280 B2 | 11/2001 | Dunn et al. | 379/230 |
| 6,327,267 B1 | 12/2001 | Valentine et al. | 370/466 |
| 6,333,931 B1 | 12/2001 | LaPier et al. | 370/385 |
| 6,381,320 B1 | 4/2002 | Creamer et al. | 379/201.1 |
| 6,442,169 B1 * | 8/2002 | Lewis | 370/401 |
| 6,584,490 B1 * | 6/2003 | Schuster et al. | 709/200 |
| 2001/0010690 A1 | 8/2001 | Shen | 370/352 |
| 2001/0012285 A1 | 8/2001 | Shaharabani et al. | 370/352 |
| 2001/0032234 A1 | 10/2001 | Summers et al. | 709/201 |
| 2001/0055299 A1 | 12/2001 | Kelly | 370/352 |
| 2002/0024943 A1 | 2/2002 | Karaul et al. | 370/338 |
| 2002/0041590 A1 | 4/2002 | Donovan | 370/352 |
| 2002/0057672 A1 | 5/2002 | Komuro | 370/352 |
| 2002/0057677 A1 | 5/2002 | Katzschner et al. | 370/352 |

* cited by examiner

Primary Examiner—John Pezzlo
(74) Attorney, Agent, or Firm—Ernest D. Buff & Associates; Ernest D. Buff; Mark J. Halvorsen (57) ABSTRACT

A call management messaging system enables the integration of the Internet with the Public Switched Telephone Network PSTN in a manner such that systems, services, and devices on either can communicate with systems, services, and devices on the other. The full benefit and unique characteristics of either network are thereby made available to these communications. Call management messages include call setup requests, call acceptance, call rejection for busy, call forwarding, and similar messages necessary for creating and disconnecting voice and multimedia communications across the PSTN or the Internet. Devices on both the Internet and the PSTN have messaging addresses, and are associated with the call management messaging system. A device creates an Internet communication with another device by dialing its telephone number.

27 Claims, 4 Drawing Sheets

CALL MANAGEMENT MESSAGING SYSTEM FOR INTEGRATING THE INTERNET WITH THE PUBLIC SWITCHED TELEPHONE NETWORK

This application claims the benefit of U.S. Provisional Application No. 60/311,401, filed Aug. 10, 2001, entitled "Call Management Messaging System For Integrating The Internet With The Public Switched Telephone Network".

BACKGROUND OF THE INVENTION

1. Field of the Invention

The present invention relates to the Internet and the Public Switched Telephone Network (PSTN); and more particularly to the integration of the Internet with the PSTN in a manner such that systems, services, and devices on either can communicate with systems, services, and devices on the other, so that the full benefit and unique characteristics of either network are available to these communications.

2. Description of the Prior Art

The Internet and the PSTN constitute discrete, independent networks from an architectural and operational perspective. Much is written about both networks, especially in terms of their architecture and operation. Consequently, the specification provided herein does not reconstruct that information other than providing general background information. The term "Internet" is commonly understood and used throughout the specification and claims in a conventional way. The Internet, in general, is an assemblage of interconnected routers that provide data transport services for server computers and user devices—typically PCs. The interconnection between routers is provided by private line data circuits, the main lines of which constitutes the Internet "backbone". Internet Service Providers (ISPS) provide access to the Internet via dial up telephone lines with modems, and via dedicated arrangements such as T-1 circuits, cable modems on cable-TV systems, and DSL (Digital Subscriber Line) service.

The Internet is designed according to the Internet Protocol (IP), which provides detailed specifications for the construction, addressing, and routing of data packets (occasionally referred to as "messages" in this document). (The term "Internet Protocol" also is used loosely to refer to dozens of related protocols that are used in the Internet.) IP addresses are expressed as a series of digits separated by "dots" (periods), in the form XXX.XXX.XXX.XXX where XXX can be a number from 0 to 255. IP addresses provide a similar function on the Internet as telephone numbers provide on the PSTN. A communication with an Internet device can be established by sending a message addressed to the IP address of that device. Every device capable of communicating on the Internet has an IP address assigned to it, either permanently, or dynamically as needed. IP addresses in some environments are replaced with a proxy address; for purposes of this document, the term "IP address" shall refer to an actual IP address, or a proxy or other identifier translatable into an actual IP address. In some of these arrangements, the IP address may be indirectly associated with the device. For example, in a wireless handset arrangement, the provider's complex might provide Internet connections for wireless handsets on a proxy basis wherein the complex keeps track of IP number assignments used for each handset, but communicates with each handset based on a serial number or other unique identifying scheme. The same goal is accomplished, i.e. an Internet capable handset gets its own IP address, but with one level of indirection. In other arrangements proxies or agents act on behalf of a client system and substitute the proxy's IP addresses for the addresses of the client devices—in these arrangements the combination of the proxy address and the original client system address resolve to provide a unique IP address for each client system. Internet data packets contain the IP address of both the sending system and receiving system (the source and destination, respectively). Since IP messages always contain the IP addresses of both the sending and destination device, when a device receives an Internet message from a sending device, it will then possess the IP address of the sender and can send messages in reply. The two devices can then engage in a communication across the Internet since each has the IP address of the other.

Routers have internal tables that provide routing instructions, which relate IP addresses to the available data circuits and access lines. A router functions by reading the destination address in a data packet, and then forwarding the data packet on one of its data circuits or access lines according to the rules of the routing tables. A data packet gets forwarded from one router to another, pinballing its way across the Internet until it reaches a router that is connected to the destination system.

The term "Public Switched Telephone Network", or PSTN, as used herein means the national and international telephone network, actuated when a user dials a telephone number associated with any other phone, causes it to ring, and if answered, is enabled to carry on a voice communication (or, more properly, a "voice grade" communication) with the person (or system) at the remote location. Just as the Internet is comprised of an aggregation of interconnected routers, the PSTN is comprised of an aggregation of interconnected local and long distance telephone switching systems. The local switching systems, referred to as telephone company (telco) central offices (CO), provide telephone subscriber services in a geographic area.

As used herein, the term "telephone central office switching system" refers generically to a class of systems, typically owned by the operating telephone company in any given area, which provide "local" telephony services to telephone subscribers in that area. Generally, the operating telephone company provides the "local loop" cabling and wiring from its central office to the physical location of each of its subscribers (a "telephone circuit", or a "line"). A telephone central office might house several switching systems of this class, each serving up to 100,000 subscribers or more. The central office represents the hub of a wheel having thousands of spokes, each spoke being a physical pair of wires providing telephone service to a subscriber in that area. Subscribers in any given area are provided service by the central office situated in the center of the area. Outside that area the wires home to other similarly situated central offices. The telephone company connects the telephone circuit of a subscriber to an access connection on the switching system, and assigns a telephone number to that circuit. In operation, the switching system (or just "switch") provides battery voltage on the phone line, sends dial tone to the subscriber line when the subscriber's phone goes off hook, receives the dialed digits, and then routes the call according to its internal instructions based on the called number.

Common manufactured switching systems of this class include the Lucent Technologies 5ESS, and the Nortel DMS100. All telephone central office-switching systems around the world are interconnected by "trunk" circuits that carry voice or voice grade telephone calls between systems, and most (if not all) such systems are also interconnected by a messaging network referred to as CCS/SS7 (Common Channel Signaling/Signaling System 7), or just SS7. Long distance calls to telephones outside of the area served by the local telephone company are typically routed to a long distance carrier, such as AT&T, MCI, or Sprint in the USA. The telephone central office switches connect via trunking and messaging circuits to a class of switching system referred to as a "toll switch", such as the Lucent Technologies 4ESS, operated by a long distance carrier. Toll switches normally do not provide local telephone services.

Conventional communication vehicles comprise computers and telephones. Computers typically have telephone lines attached to them, and telephones oftentimes have computers attached to them; but there is no true integration that enables the blending of the Internet and the PSTN. The level of integration that is presently attained permits a computer to use a phone line to dial into the Internet. Once on the Internet, the computer can access another computer by entering its Internet Protocol (IP) address into application software such as a browser.

In an associated matter, there are now a variety of technologies that provide both Internet and PSTN connectivity. These technologies include: (i) Voice over IP (ii) DSL service; (iii) cable modem service delivered by cable-TV systems; (iv) fixed wireless systems; and (v) Internet capable cellular wireless systems. The following provides a brief review of these technologies.

In one aspect, the systems described herein relate to Voice over IP service. The term IP refers to the "Internet Protocol", the basic protocol of the Internet, while the term Voice over IP refers to sending digitized voice across the Internet using the IP protocol. Several companies provide discount rate phone calls using "Voice over IP" (VoIP) technology, wherein a long distance call of a client, typically a Personal Computer (PC) user, is carried over the Internet to a VoIP interface device in the vicinity of the called party. Such VoIP technology avoids the charges associated with placing a long distance call with a traditional long distance carrier. The interface device dials a local call on the PSTN to complete the connection for the VoIP client. Hence, the call travels partially over the Internet and partially over the PSTN as an analog call. A VoIP software application at the client device digitizes the user's voice and sends that as data messages across the Internet to the VoIP interface device. The VoIP interface device in turn converts the data messages to analog signals that are output onto the analog phone line. In the reverse direction, the VoIP interface device receives analog signals from the dialed phone and converts those analog signals to digital messages which it sends across the Internet to the VoIP client. The VoIP software at the client converts those digital messages to analog signals, which are output to the user via speakers.

In another aspect, the systems described herein relate to an Internet access technology currently being deployed that is referred to as DSL (Digital Subscriber Line) service. (The original acronym was ADSL, for Asynchronous Digital Subscriber Line.) Although there are some variations on the technology (now generically referred to as "xDSL"), it essentially involves an analog telephone line supplemented by a high frequency carrier signal superimposed on the telephone line by a pair of modems—one at the subscriber location, and one at the telephone company central office. The DSL carrier signal can carry high-speed data concurrently over the same phone line without interfering with the analog phone service. Other than being carried by the same physical wires, the phone line has no relationship to the DSL Internet service.

In another instance, the matter to be discussed relates to virtual phone service provided via cable-TV. Cable-TV service has been used to provide high-speed Internet access—the popular "cable modem" service. In addition, there are a number of current activities related to delivering alternative provider telephone service via the cable-TV distribution system. Similar to the Internet access service arrangement, the telephony service arrangement utilizes a "cable modem" to transmit and receive voice grade telephone calls. Other than being carried by the same physical cable, telephone service provided by cable-TV has no relationship to the cable modem Internet service.

A related matter is that of virtual phone service provided by the so-called fixed wireless arrangement, currently undergoing field trials in some areas, and by the newly introduced cellular telephone service with Internet access. Although these are substantially different services from a user perspective, the wireless infrastructure is much the same.

In each of these technologies, even though they provide both Internet and PSTN connectivity, the Internet aspect is separated from the telephony aspect. Furthermore, none of these technologies support a messaging system that enables one device to create an Internet communication with another device simply by dialing its telephone number.

The objective of this patent application is to describe a call management messaging system which has the capability of integrating the Internet with the PSTN such that one device can create an Internet communication with another device simply by dialing its telephone number.

In the current state of the art there are two inter-related messaging systems utilized within the PSTN. These are: (i) SS7; and (ii) ISDN (Integrated Services Digital Network), which incorporates a messaging system as an element of a broader product and service architecture. The SS7 messaging system extends through the major elements and systems of the PSTN, connecting virtually all of the local and long distance central offices, and carries call management (or call control) messages relating to call setup and disconnection and similar call management functions. Whereas the SS7 messaging system is oriented toward providing messaging communications among and between the PSTN switching systems, the ISDN messaging system is oriented toward extending the PSTN messaging system to the end devices such as telephones and office telephone systems. Rather than going off hook and drawing dial tone from the local central office switching system to initiate a call, as analog phones do, an ISDN phone sends a packetized message to the switching system to initiate a call. Both the ISDN messaging system and the SS7 essaging system are based on the X.25/X.75 communications protocols. ISDN messages are carried on the SS7 messaging network. Disadvantageously, neither the SS7 nor the ISDN messaging systems carry any messages related to creating an Internet communication by one device dialing the telephone number of another.

The ISDN and SS7 messaging systems are call setup and call management (or call control) systems which carry a spectrum of messages, message responses, message acknowledgements, and the like, such as are necessary to conduct telecommunications. A full listing of all the message types that might be employed in a robust telecommunications environment has not been attempted herein, since that depth of information is not necessary to convey the essential elements of this invention. A brief listing of those message types include: (i) call setup request messages which convey dialing and associated information; (ii) busy signal messages telling the calling device to deliver a busy signal to the user; (iii) audible ring back messages telling the calling device to deliver "pacifier" ringing to the user; (iv)

call request acceptance or rejection messages (v) call connect messages; (vi) call disconnect messages; (vii) switchhook flash messages; (viii) call transfer request messages; (ix) call conference messages; (x) call waiting messages; (xi) Caller-ID and Call Waiting-ID messages; and (xii) call forwarding messages to redirect a call to another device. In addition to these messages, a variety of other messages would be employed to indicate information like "network busy", "invalid telephone number dialed", and the like.

No means are provided in the arrangements described above for the calling and called device to create an Internet communication between themselves when one of the devices is called by dialing a telephone number.

Because of this void, there remains a need in the art for a method and means for a call management messaging system to integrate the Internet with the PSTN such that the benefits of multimedia Internet communications are available to dialed telephone calls.

SUMMARY OF THE INVENTION

Central to the principles and practice of this invention, as well as the inventions disclosed by certain co-pending patent applications (described hereinafter), is a means for enabling a calling device to create an Internet communication with another device simply by dialing its telephone number, thus integrating the Internet with the PSTN. The copending patent applications describe various aspects of this integration. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein. The enhanced capabilities provided by the present invention facilitate that integration.

The present invention provides a messaging system having a method and means for integrating the Internet with the Public Switched Telephone Network (PSTN). An essential element for integrating the Internet with the PSTN is a messaging system capable of conveying call setup and associated call management messages of a specific nature to and between communications systems, services, and devices. This patent application discloses such a messaging system. In general, elements of the PSTN, such as a central office switching system, or a switching system integrated interface device, obtains the IP address of either the calling or called device from one of a variety of potential sources, and provides that IP address to the other device via the messaging capability. If either of the calling or called devices is provided with the IP address of the other, it may initiate an Internet communication with the other device by sending an appropriate message addressed to the other device's IP address. Since the Internet Protocol incorporates the IP address of the sender and the receiver in every message, when one device initiates an Internet communication to the other, the receiver automatically learns the IP address of the sender and a two-way communication can commence.

There are a variety of ways to obtain the IP address of a calling or called device. In each such arrangement, there are provided telephone number cross-references which contain the IP address associated with the telephone number of an Integrated Device. In simple terms, Internet devices or telephone devices wishing to communicate with an Integrated Device known by a telephone number can determine if that telephone number has an IP address associated with it by looking it up in a cross-reference, or by having an agent such as a telephone central office perform that lookup. In some arrangements, the calling or called device or a central office system will send a query message via the messaging system to a cross-reference system and will receive the IP address by a reply message. Cross-references of IP addresses to telephone numbers could be maintained in the Internet, in the PSTN, in the device, or in any combination of the three.

Once an IP address has been obtained for a calling or called device it must be delivered to the other device. This invention also provides a means for delivering the IP address of one device to the other. In general terms, this comprises an addressable digital messaging arrangement such that digital messages can be sent to one or the other of the two devices. The Internet, of course, satisfies this requirement and is suitable in some arrangements. However, there also are other available technologies suitable for sending addressable digital messages in a telecommunications environment, such as the SS7 network and the messaging component of ISDN service (Integrated Services Digital Network). This aspect of the invention inherently requires that the sender know the digital address of the device to which the message will be sent. In some arrangements, that address will be an IP address, perhaps discovered from a cross-reference. In other arrangements, such as an ISDN environment, that address is automatically tied to the telephone number, so one device only needs to know the telephone number of the other to send it an ISDN message. In yet other arrangements, the telco switching system will know that address from subscriber records.

The messaging communications facility carries call management (e.g., call setup, call control), telephone number, and IP address messages to and from the switching system, switching system interface devices, and to and from the terminal (user) communications devices. A purpose of the messaging is to provide the calling or called device, or both, with information adequate to conduct a communication between themselves over the Internet when that communication was started by one device calling the telephone number of the other device on the PSTN.

There are several possible messaging systems that the PSTN might use to obtain an IP address and to notify the calling or called device of the remote device's IP address. The messaging communications as specified in this patent application utilizes one or more of these existing technologies. The messaging communications extends directly or indirectly to one or the other or both of the calling and called devices. The worldwide PSTN has the SS7 messaging system interconnecting all the major switching centers. Telephone companies will likely use SS7 for this purpose, for example, by forwarding an IP/phone number query to the serving agency of the called device via SS7, and receiving the query response and IP address by SS7. As other possibilities, the PSTN can use an existing messaging technology such as the digital messaging capability incorporated into the Integrated Services Digital Network (ISDN), or Analog Display Screen Interface (ADSI). As still another possibility, the PSTN might have Internet access in order to communicate via Internet messages with the calling or called device, switching system interface devices, or other central office switching systems. Further, the PSTN might use a mix of technologies, for example, SS7 might be used to transport call management and IP address messages from one C.O. to another, but ISDN or ADSI might be used to communicate the same information to the terminal (user) device. Since multiple workable arrangements are possible, it is only required that the PSTN have a method of sending appropriate messages to one or the other or both of the calling and called devices.

The ADSI messaging capability mentioned above is a simplistic messaging technology of modest success, which is an outgrowth of Caller-ID. ADSI is a superset of the Automatic Number Identification (ANI) protocol used by Caller-ID and Call Waiting-ID. The terminology ADSI is used generally herein to encompass ADSI, ANI, Caller-ID, and Call Waiting-ID. ADSI provides 1200 bit per second modem communications messaging between a telephone central office and an analog ADSI phone, or between two ADSI phones, one acting as a server. The messaging is interruptive, in that modem connections use the voice frequency band and so, at any moment, an analog telephone line can carry either a voice conversation or an ADSI modem connection, but not both. As an example, Call Waiting ID interrupts the called party's audio for a second or so while ADSI Call Waiting data (the calling phone number) is being received. The data rate is very slow, and so has limited applications. Nevertheless, since Caller-ID, Call Waiting ID, and some other services have been implemented using ADSI, it would be advantageous for the PSTN messaging system to optionally have available a messaging system mode that is compatible with ADSI. The utility might be limited, but might be suitable for some purposes, products, price ranges, and the like.

Devices for integrating the Internet with the PSTN ("Integrated Devices"), as specified in the co-pending patent applications, have both an Internet connection with an associated IP address, and have a telephone connection with an associated telephone number, although VoIP calling devices need not have a telephone connection or phone number. The telephone connection to the PSTN could be a virtual telephone line, such as that being provided over cable-TV systems. Additionally, Integrated Devices provide a cooperative messaging communications capability for communicating call setup and call control messages with the PSTN wherein the messages convey telephone number and IP address information, as provided for in this application.

As mentioned above, cross-references of IP addresses to telephone numbers could be maintained in the Internet, in the PSTN, in the terminal (user) device, or in any combination of the three. The Internet already maintains a cross-reference system, referred to as the Domain Name Service (DNS), which allows an Internet "site" or "location" to be publicly known by an alphanumeric name, such as Sears.com or Toyota.com, rather than by the strictly numerical IP address. (A master registry is maintained by the InterNIC organization, and is copied daily to thousands of DNS servers around the world.) This DNS service could be expanded to also maintain telephone numbers for these Internet locations. In addition, the cross-reference of IP addresses to telephone numbers could be indirect via the use of names by looking up a telephone number (TN) to find a name, then looking up the name to find the IP address. In the more straightforward version of this arrangement, if an Internet device wished to communicate via the Internet to a device known by a telephone number, it could query an appropriate DNS server for the telephone number. If the called device is listed in the DNS server as having an IP address, the calling device will receive that information back from the query. The calling device may then communicate with the called device via the Internet.

In another cross-reference version, the Integrated Devices themselves could provide the cross-reference of telephone number to IP address by a device knowing its own TN and IP numbers. The calling and called devices could exchange this information using available techniques such as the messaging system incorporated into ISDN.

The PSTN could also maintain a cross-reference of telephone numbers having associated IP addresses. Thus, if a device, having an IP address, called a second device, also having an IP address, and the PSTN maintained a cross-reference of these numbers, then the PSTN could notify the caller of the called device's IP address via a digital messaging arrangement (or optionally, notify the called device of the caller's IP address). The caller could then communicate directly with the called device via the Internet. In the discussions of the PSTN, it should be understood that the PSTN is no more a monolithic whole than is the Internet. It is comprised of very many telephone companies and authorities, and each might have very many switching centers (telephone company Central Offices). Therefore, in an arrangement in which "the PSTN" maintains a cross-reference between phone numbers and IP addresses, an authority, company, regional district, or Central Office would likely maintain such a cross-reference for local subscribers, and depend on other authorities, companies, regional districts, or Central Offices to maintain the same information for their own local subscribers. Further, a cross-reference may be associated with a central office switching system, or associated with a switching system interface device, or other element of a switching center.

There are five primary scenarios involved in the establishment of an integrated Internet/PSTN call. In the first scenario, the telephone central office switching system receives a digital call setup message, which includes the calling device's IP address (the other scenarios presume that the call setup message does not include the calling device's IP address). The call setup message could be received by the switching system directly from the calling device, from a switching system interface device (VoIP, DSL, cable-TV, and the like) that provides Internet and telephony services to its client devices, or, via the SS7 messaging system, from another telephone central office switching system where the call originates. In its most simple implementation, the switching system forwards the digital call setup message, or the essential elements of such a message, to the called device using an available messaging communications medium, such as ISDN, SS7, or one yet to be defined. That message is sent directly to the called device if it is directly connected to the switching system, via a switching system interface device (again, VoIP, DSL, and the like) if the device is a client of such an interface system, or, if the called device is served from another switching system, sent via SS7 to the terminating central office switching system which provides telephone service for the called device. For messages to be sent via a switching system interface device (VoIP, DSL, and the like), the interface device must subscribe to the arrangement described in the co-pending patent application "Telephone Central Office Switch Interface With Messaging Channel For Integrating The PSTN With The Internet", Ser. No. 60/301,758.

The called device, upon receiving such a call setup message, may accept or reject the requested Internet connection (perhaps its connection to the Internet is temporarily out of service) by sending a return message to the central office switching system. If it chooses to accept the request, since now it has the IP address of the caller, the called device simply sends a call acceptance message via the Internet directly to the calling device, and an Internet communication will then commence. That acceptance message could also be sent in the reverse path via the switching system to the calling device, the particular path that the acceptance message traverses being unimportant to the central concepts. And then, via either Internet or switching system messaging, the two devices may mutually decide whether to conduct all communications over the Internet and abandon the PSTN portion, or to conduct any portion of the communications over the Internet and any portion over the PSTN. Obviously, then, either or both devices would send appropriate messages to the switching system to ensure it properly handled the PSTN portion of the call: i.e., set up a PSTN connection, or don't set up a PSTN connection.

In a more elegant variation of this process, the switching system determines whether or not the called device is an Integrated Device by referring to a records system which maintains subscriber service information including the TN, Integrated Device status, and perhaps other information such as the device's associated IP address and any other identifier for the device as used by the switching system. If the called device is not an Integrated Device the switching system responds to the call setup message by rejecting the request for an Internet connection, and continues by setting up a conventional analog connection to the called device. In practical implementations one might expect more robust protocols than those just described, specifying exactly how messages and requests are acknowledged, accepted, rejected, etc., (e.g., what happens if a message is not acknowledged, is there a time-out and retry, or the like), but those details are not relevant to the concepts being presented herein, and one skilled in the art should be able to craft a suitable protocol suite for this purpose by modeling after similar protocol suites.

Variations on the above process are also possible. For example, the central office switching system might obtain the IP address of the called device and deliver that address to the calling device, permitting the calling device to initiate the Internet communications. Additionally, the PSTN might obtain the IP addresses of both the calling and called devices, and provide each device with the IP address of the other.

In the remaining arrangements to be described, it is presumed that the call setup request does not provide the IP address of the calling device. There are four of these arrangements: in one arrangement, the central office switching system retrieves the IP address from subscriber records that it maintains; in another arrangement, the central office switching system retrieves the IP address from either or both of the calling or called devices themselves; in another arrangement, the central office switching system retrieves the IP address from the interface device which provides Internet and telephony services for the calling or called device; in the last arrangement, the central office switching system retrieves the IP address from an Internet source. In all the arrangements, the fundamental process is the same: the telephone central office switching system obtains the IP address for at least one of the calling and called devices, and delivers that IP address to the other of the calling and called devices via a digital messaging system. These arrangements will be described hereinafter in greater detail.

In any of the above arrangements, the resulting "communication" between the devices could be entirely over the Internet (voice, screens, images, etc.), or part of the communication could transpire over the Internet (the screens and images, for example), and part could transpire over the PSTN (the voice communication, for example). An arrangement in which the voice communication is carried over the PSTN solves a long-standing VoIP problem—that of poor audio quality. Internet telephony arrangements have no direct way to control the path that voice message packets (or any packets) take as they traverse the Internet. The number of router hops is unpredictable, even from one packet to the next, and packets can be routed over heavily trafficked and congested links, causing lengthy delays. In addition, the congestion control mechanism utilized by Internet routers is to simply discard packets since the higher level protocols (such as TCP and UDP) are designed to resend missing packets.

The net result, due to routing ambiguities, congestion, out of sequence packets and dropped packets, is that the delivery of Internet data has a high degree of variability from a timing perspective. In general this is not of significance in the delivery of visual information, web pages for example; we can wait for a web page to be constructed on the screen, and it doesn't matter if various parts are randomly constructed before other parts. Audio data, however, is significantly affected, and one of the biggest detractions to Internet telephony is poor quality audio. Since the receiving device must deliver the audio stream to the listener with rather precise timing, missing, out of order, or delayed audio data packets cannot be included in that audio stream. Consequently, the delivered audio stream can have voids of uncontrollable lengths, along with a variety of other undesirable audible artifacts that collectively constitute bad sound quality.

On the other hand, the PSTN provides a dedicated (channelized) connection for each telephone call, which avoids all the problems characteristic of the Internet. Consequently, then, an arrangement is provided for in this application in which visual information traverses the Internet and audio information traverses the PSTN, thus providing the best features of each network to the resulting communications.

Certain enhancements over the co-pending patent applications are herein described. As previously stated, the present invention is a messaging system that provides a method and means for integrating the Internet with the Public Switched Telephone Network (PSTN). According to the co-pending patent applications, an essential element in integrating the Internet with the PSTN is a messaging system capable of conveying call setup and associated call management messages of a specific nature to and between communications systems, services, and devices. The present invention augments the copending applications by disclosing such a messaging system.

The present invention accomplishes the integration of the Internet with the PSTN by creating a messaging system between the various elements of the PSTN which are involved in creating an Internet communication by one device dialing the telephone number of another. The messaging system is a call setup and call management system which carries a spectrum of messages, message responses, message acknowledgements, and the like, such as are necessary to conduct telecommunications. A full listing of all the message types that might be employed in a robust telecommunications environment has not been attempted herein, since that depth of information is not necessary to convey the essential elements of this invention. Those message types include: (i) call setup request messages which convey dialing and associated information; (ii) busy signal messages telling the calling device to deliver a busy signal to the user; (iii) audible ring back messages telling the calling device to deliver "pacifier" ringing to the user; (iv) call request acceptance or rejection messages (v) call connect messages; (vi) call disconnect messages; (vii) switchhook flash messages; (viii) call transfer request messages; (ix) call conference messages; (x) call waiting messages; (xi) Caller-ID and Call Waiting-ID messages; and (xii) call forwarding messages to redirect a call to another device. In addition to these messages, a variety of other messages would be employed to indicate information like "network busy", "invalid telephone number dialed", and the like.

The co-pending applications describe an environment in which the various elements of the PSTN are enabled to conduct digital, packetized messages, suitable for the messages of the messaging system of this invention. Although not limited to the scope of the following listing, these enabled PSTN elements include: (i) the end or terminal devices such as telephones and Integrated Devices; (ii) telephone central switching system interface devices, such as those for VoIP, DSL, cable-TV, and the like, which provide telephony and Internet services for client devices; (iii) telephone central office switching systems which provide telephony services for client devices; (iv) telephone long distance switching systems which provide long distance capabilities on the PSTN; (v) office telephone systems such as PBXs, Key Systems and the like; and, (vi) adjunct devices such as automated attendant systems, automatic call distributors, voice mail systems, and the like.

Some of these devices, including the end or terminal (user) devices, are uniquely addressable within the messaging system via an IP address, telephone number, or other identifier associated with the device. Other identifiers could include an internal system reference (e.g., module, cabinet, shelf, slot, port number), an ISDN (Integrated Services Digital Network) address, or the like. Regardless of the nature of the address, Integrated Devices have messaging addresses known to the serving system such as a telephone central office switching system, telephone central office switching system interface device, office telephone system, and the like, such that the serving system can communicate with the Integrated Devices via the messaging system.

The messaging system of this invention connects between each of these devices and systems, and the messages of which the messaging system is comprised are transmitted to and between each of these devices as are necessary for any individual communication. Some devices and systems may simply act as a pass-through for the message stream by passively or actively forwarding messages, or may act as a pass-through for specific message types while acting upon others. Each device or system may send, receive, forward, or act upon any given message as is necessary to accomplish the message functions. Messages may be sent in one or more pieces from one device to the next, and devices may assemble, reformat, repacketize, augment a message with additional data as a message, or otherwise manipulate a message as is processed through the system.

In one aspect of this invention, call setup request messages initiated by a device to create an Internet communication by dialing the telephone number of the called device incorporate the IP address of the calling device (or a proxy of that IP address) as well as the dialed telephone number. In this arrangement the central office switch obtains the IP address of the calling device from the call setup message, and then delivers that IP address to the called device, both message transactions occurring via the messaging system of this invention.

In another aspect of this invention, if the call setup request message does not contain the IP address of the calling device, the telco switch will obtain the IP address of the called device, the calling device, or both, from one of several possible sources for maintaining a cross-reference of IP addresses and telephone numbers. The cross-reference of IP addresses could alternately include a proxy for an IP address, or other identifier translatable into an IP address; and the cross-reference of telephone numbers could alternately include internal system addresses or other identifiers associated with the device rather than the telephone number of the device. Possible cross-reference sources include: (i) a records system of the switch which maintains data about its client devices; (ii) a records system of a telco central office switch interface device (DSL, cable-TV, and the like) which maintains data about its client devices; (iii) the client devices themselves; or (iv) an Internet source, such as a Domain Name Service (DNS) which has been enhanced to add telephone numbers cross-referenced to IP addresses and domain names (e.g. www.microsoft.com). The messaging system of this invention provides a facility for the telco switch, or other element of the PSTN, to query these sources by sending a request message to the source containing a device's telephone number or other identifier, and to receive back a reply message containing that device's IP address or alternate IP address identifier. The telco switch, then having the IP address associated with either or both of the calling and called devices, delivers the IP address of at least one device to the other device via the messaging system, whereupon an Internet communication may commence between the two devices.

Once an Internet communication has been established between two devices, they may elect to conduct any portion or all of the communications over the Internet, and may determine whether to maintain or drop the PSTN portion of the communication. Certain other messages would be utilized by the devices to notify the telco switch as to the success or failure of the intended Internet communication, and whether or not to drop the PSTN portion of the communication.

In cases where an Internet capable device places a call, the default operation is to create a multimedia Internet communication with the called device, as per the previous description. But, if the called device is not capable of an Internet communication, as determined by the telco switch, the switch will process the call setup request as an analog (conventional) call across the PSTN. Under this circumstance the PSTN will utilize certain other messages to notify the calling device of the establishment of a PSTN connection in lieu of creating an Internet connection. The nature of this operation is that a multimedia Internet call will automatically be created whenever possible, and when not possible an analog call will be created. Thus, this arrangement is backwardly and seamlessly compatible with the existing environment of analog telephony.

For convenience of expression the conventional telephony environment is referred to herein as "analog" since that technology predominates, even though there is at least one digital telephony arrangement in fairly common use—that being ISDN. The term "analog" is used herein to draw the distinction between the current telephony environment, whether analog, ISDN, or other existing technology, and the environment of the present invention, which involves a digital packetized call management messaging system, Integrated Devices capable of digital packetized voice, multimedia communications, and creating an Internet communication with another device by dialing its telephone number, along with associated systems and devices which are capable of sending, receiving, and otherwise manipulating digital messages. Specifically, the reader should interpret the term "analog" (or "analog device", "analog call", and so on)

as relating to devices or operations of the conventional telephony environment which are not capable of creating an Internet communication by dialing the telephone number of an Integrated Device, or of creating an Internet communication with an Integrated Device if the Integrated Device dials the telephone number of the analog device.

In the conventional telephony environment, the PSTN manages call-handling resources for its client devices (telephones, and the like). As an example, if a phone has one line, and that line is in use, the PSTN, via the caller's local telco switch, delivers a busy signal to a second caller. However, if the phone has subscribed to call waiting, the serving telco switch for the phone will deliver call-waiting tones to the phone, and direct the second caller to receive audible ring back. Similarly, other examples could be drawn demonstrating how the PSTN manages call-handling resources for its client devices (e.g., what if the phone had two lines, and there were three incoming calls?).

In an Internet and PSTN environment where the PSTN is not the only source of calls, each device must manage its own call-handling resources, and must do so cooperatively with the PSTN because devices having both an Internet connection and a PSTN connection may receive call setup request messages directly across the Internet from an unrestricted number of sources. Since these call setup requests are not being directed through the PSTN, the PSTN is unaware of their existence, and therefore cannot manage the call-handling resources of its client devices. Call-handling resources of an Integrated Device include physical or virtual line appearance buttons, the number of simultaneous calls to be accepted by the device, and the bandwidth available to communications. These parameters may be determined by physical constraints of the device, or may be configurable by the user or system provider. Therefore, in another aspect of this invention, and to manage this environment, the messaging system extends across the Internet, or across any other medium such as a wireless arrangement, between the calling and called devices, and extends on the PSTN between the device and the local serving central office switch. Specifically, this invention provides the capability for an Integrated Device having both an Internet connection and a PSTN connection to convey messages across both media appropriate to manage its own call-handling resources. Messages from calling devices on either the Internet or the PSTN include call setup request messages, Caller-ID messages, Call Waiting messages, and Call Waiting-ID messages, among others. Response messages from the called Integrated Device include accepting calls, rejecting calls due to a busy condition, forwarding calls to another number or device, and the like.

As an example, consider that an Integrated Device having both an Internet connection and a PSTN connection were configured to accept two simultaneous calls with two virtual screen buttons, one to represent each call. If both line buttons were in use from Internet calls and there was another incoming call from the PSTN, there would be no way for the telco switch to directly know of this circumstance and to send a busy signal to the new incoming call. Thus it is incumbent upon the called device, upon receiving a call setup request message from the telco switch, to send either a call acceptance or rejection message to the switch. In this example, the Integrated Device would send a call rejection message to the switch, causing the switch to direct a busy signal to the caller. Similarly, any number of Internet devices might attempt to call an Integrated Device across the Internet at any given time, and since there is no central control in this environment, the Integrated Device must manage its call-handling resources by sending call acceptance or rejection messages directly to each calling device. Thus, extending this example, if there were another incoming call from an-Internet device, the called Integrated Device would send a call rejection message to that device also, causing that device to deliver a busy signal to the user who originated the call.

The PSTN SS7 messaging system extends through the major elements and systems of the PSTN, connecting virtually all of the local and long distance central offices. The SS7 messaging system is used for call setup and disconnection, and similar call management functions. In addition, the associated ISDN technology incorporates a messaging system, the messages of which are carried on the SS7 messaging network. Both the ISDN messaging system and the SS7 messaging system are based on the X.25/X.75 communications protocols. In one embodiment of this invention, the messaging system of this invention is an extension of the ISDN messaging system, utilizing X.25 messages formatted according to the ISDN standards. In another embodiment, the messaging system of this invention is carried on the SS7 PSTN messaging network.

Although it would not be necessary for the messages being sent across the Internet and the PSTN to be identical, it would be efficient and economical for that to be the case. Therefore, in still another embodiment, this invention provides that call-handling resource management messages of equivalent function on the Internet and on the PSTN, as well as other messages of equivalent function, are identical except for packetization, and may be identical even with packetization. The packetization issue refers to the fact that the PSTN presently does not use Internet Protocols for internal messaging. One implementation would therefore be to use the PSTN messaging protocol within the PSTN, and to use the Internet Protocols on the Internet. To accomplish this goal, another embodiment specified by this invention utilizes the X.25 protocol for this messaging system for transport across the SS7 messaging network, and packetizing the X.25 packets within IP packets to be sent over the Internet (X.25 over IP). However, a preferred implementation is to use Internet Protocols for both media so that the messages are exactly the same, regardless of the target device's network. In this arrangement X.25 over IP is transmitted across both the Internet and the PSTN, the PSTN being suitably modified to accept Internet protocols.

This invention then, provides for a method and means for a call management messaging system to integrate the Internet with the PSTN such that one device can create an Internet communication with another device simply by dialing its telephone number, and the benefits of Internet multimedia capabilities can apply to those communications.

BRIEF DESCRIPTION OF THE DRAWINGS

The invention will be more fully understood when reference is had to the following detailed description of the preferred embodiment of the invention and the accompanying drawings, in which.

DETAILED DESCRIPTION OF THE INVENTION

The present invention provides a messaging system that having a method and means for integrating the Internet with the Public Switched Telephone Network (PSTN); more specifically, it enables a calling device to establish an Internet communication with a called device simply by dialing its telephone number. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein. An essential element in integrating the Internet with the PSTN is a messaging system capable of conveying call setup and associated call management messages of a specific nature to and between communications systems, services, and devices. Such a messaging system is disclosed by the present application.

Co-pending patent applications describe various aspects of this integration; the enhanced capabilities provided by the present invention facilitate that integration. The following provides an overview of the co-pending patent applications.

Co-pending patent application entitled "Integrated Device For Integrating The Internet With The Public Switched Telephone Network", Ser. No. 60/301,756, describes "Integrated Devices", for integrating the Internet with the PSTN, which have an Internet connection with an associated IP address, a PSTN connection with an associated telephone number, and a digital messaging connection to the PSTN for conveying call management messages to include messages containing telephone numbers and IP addresses.

Co-pending application entitled "Integrating the Internet with the Public Switched Telephone Network", Ser. No. 60/301,757, describes an enhanced communications environment in which a telephone call placed to an Integrated Devics creates end-to-end communications over the Internet rather than over the PSTN. The present invention augments the system disclosed by co-pending application Ser. No. 60/301,757 by providing a method and means for enabling a telephone central office switching system to engage in specific messaging communications to individual telephony and Internet devices. Such messaging facilitates end-to-end Internet communications.

There exists a class of devices, such as those for Voice over IP, DSL, cable TV, fixed wireless, Internet capable wireless cellular, and similar distribution systems, which provide Internet and telephony services to client devices, such as phones and PCs, by providing an interface to the telephone company central office switching system. Co-pending application entitled "Telephone Central Office Switch Interface With Messaging Channel For Integrating The PSTN With The Internet", Ser. No. 60/301,758, discloses a method and means for providing specific messaging capabilities between a telephone central office switching system and this class of interface device, enabling the integration of the Internet with the PSTN. The communications link carries call setup, telephone number, and IP address messages to and from the switching system and to and from the client devices of the interface device.

Co-pending patent application entitled "Telephone Switching System For Integrating The Internet With The Public Switched Telephone Network", Ser. No. 60/306,294, discloses a method and means for a telephone central office switching system to enable a calling device to establish an Internet communication with a called device by dialing its telephone number.

Co-pending patent application entitled "Integrated Telephone Central Office Systems For Integrating The Internet With The Public Switched Telephone Network", Ser. No. 60/306,293discloses an integrated assembly of telephone central office switching system integrated interface devices, comprising telephone central office switching systems, and switching system interface devices such as those for providing DSL service, Voice over IP (VoIP) service, cable modem service, fixed wireless service, and Internet capable cellular wireless service. The integrated telephone central office systems therein described offers efficiencies and economies further benefiting the integration of the Internet with the PSTN.

Co-pending patent application entitled "Interactive Device Control System For Integrating The Internet With The Public Switched Telephone Network", Ser. No. 60/317,055, discloses a system for the PSTN and the Internet in which a communications system offers the user of a device such as a screen phone the ability to control or influence functions of the communications system by presenting the user with a displayed menu of options. The menu of options is sent to the user's device by the communications system via a messaging system. Selection of an option by the user returns a response message to the communications system via the messaging system. Upon receipt of the response message, the communications system actuates the function associated with the user-selected option. The interactive device control system operates seamlessly across both the Internet and the PSTN, thus providing further integration of those two networks.

Co-pending patent application entitled "Stored Profile System For Storing And Exchanging User And System Communications Profiles To Integrate The Internet With The Public Switched Telephone Network", Ser. No. 60/317,057, discloses a system for the PSTN and the Internet to maintain and exchange communications related information such as hardware capabilities and personal information and preferences. The Stored Profile System enables devices to synchronize and optimize their communications capabilities, and enables users to exchange contact information such as Electronic Business Cards as a part of call setup, operating like an enhanced Caller-ID. The stored profiles capability extends to communications systems on both the PSTN and the Internet, thus further promoting the integration of the Internet with the PSTN.

The co-pending applications described hereinabove provide reference information useful in developing a full understanding of the present invention as it relates to these systems and devices. Accordingly, the disclosure of each aforementioned co-pending application is incorporated herein by specific reference thereto.

Certain enhancements over the co-pending patent applications are herein described.

Figure 1:
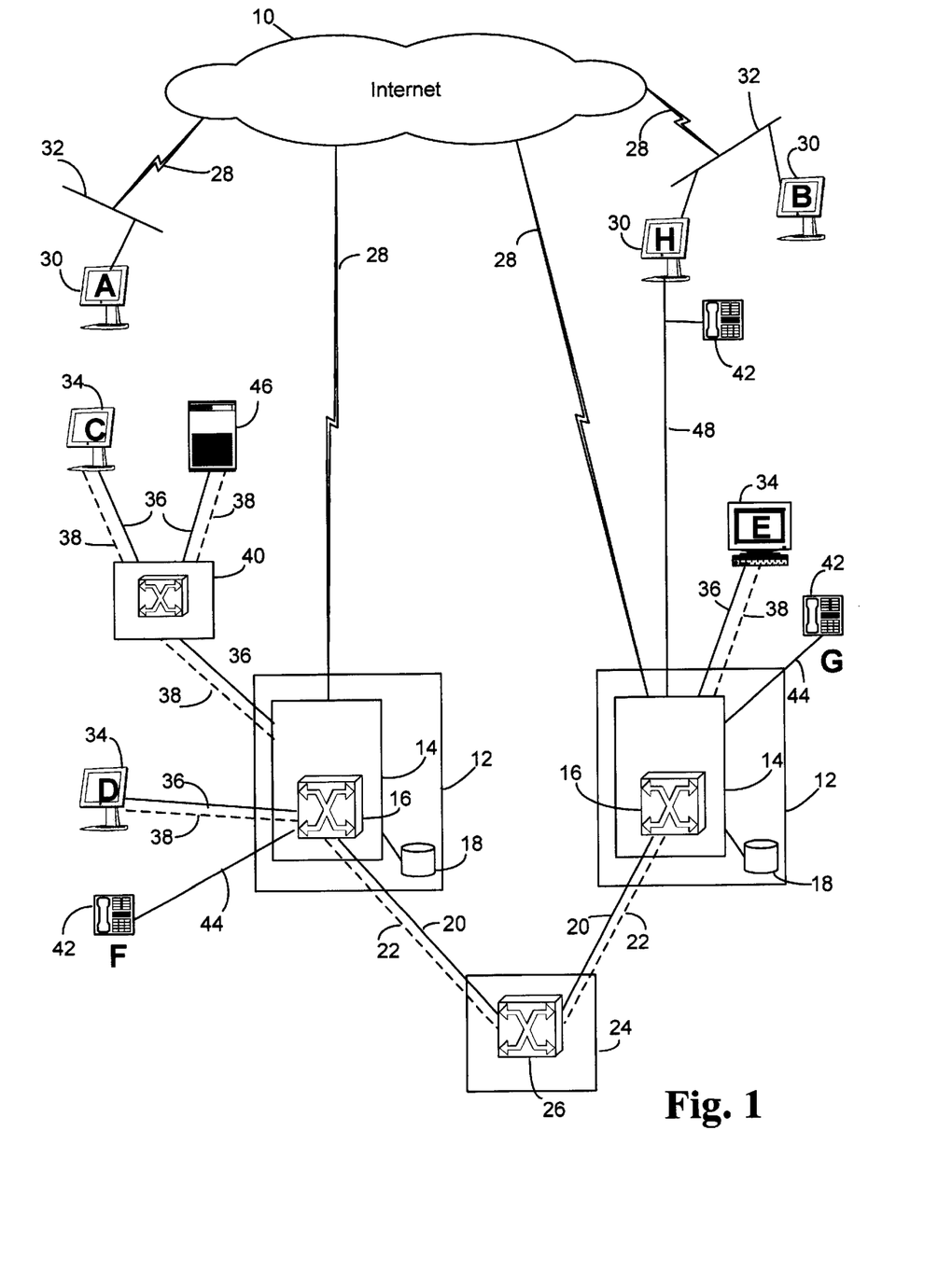
FIG. 1 is a schematic drawing of the Internet and major elements of the PSTN, illustrating a variety of communications devices and connectivity of the call management messaging system.

FIG. 1 is a schematic drawing of the Internet and major elements of the PSTN, illustrating a variety of communications devices and the connectivity of the call management messaging system interconnecting the various parts into a seamless whole, capable of functioning as a single, integrated system.

Referring to FIG. 1, Internet 10 has connected to it workstations 30, labeled A and B, each workstation residing on a LAN 32 which is connected to the Internet via a high-speed access line 28, such as a T-1 line. Such access lines are capable of carrying multiple, simultaneous data communications sessions, and are suitable for carrying packetized call management messages as specified by this patent application, as well as packetized voice and multimedia communications.

Also connected to the Internet 10 via access lines 28 are two telephone central offices 12, each comprising an integrated telephone central office system 14, which incorporates a telephone switching system 16. Integrated telephone central office systems are specified in co-pending patent application entitled "Integrated Telephone Central Office Systems For Integrating The Internet With The Public Switched Telephone Network", Ser. No. 60/306,293. Integrated telephone central office system 14 has accessible to it records system 18 which maintains service records and related information of the client devices associated with the integrated telephone central office switching system. This information includes telephone numbers and IP addresses of client Integrated Devices. Integrated telephone central office system 14 is further comprised of the following elements internal to its construction and not brought out in the illustration: a router function, a messaging communications channel, and a voice communications channel, each of which is accessible to all the elements of the integrated telephone central office system. The integrated telephone central office system may additionally be comprised of integrated switching system interface devices for providing Internet and telephony services for client devices such as computers, telephones, and Integrated Devices; these interface devices may include systems providing DSL service, cable-TV distribution for cable modem and telephony over cable service, Voice over IP (VoIP) service, fixed wireless service, and Internet capable cellular wireless service. The messaging communications channel distributes the call management messaging system of this invention to all the elements of the integrated telephone central office system, and provides connectivity to externally attached devices and systems, including records system 18.

Records system 18 is shown as being an attachment to central office systems 14, but could be located remotely from the central office, and could reside in the Internet as a DNS function.

Telephone central offices 12 are interconnected to a telephone long distance central office 24 by communications links 20 having call management messaging system capability 22. All major telephone central office switching systems are interconnected by the SS7 messaging system, which may provide data transport for the call management messaging system capability 22. Optionally, the call management messaging system may operate over another data communications facility, either existing or yet-to-be-devised. For example, the call management messages being described may be transported between the two central office systems 14 across the Internet via access lines 28, rather than traversing the PSTN links 22.

Connected to the integrated telephone central office systems 14 via analog phone lines 44 are analog telephones 42, labeled F and G. Also connected to the integrated telephone central office systems 14 via multiplexed access lines 36 having call management messaging system capability 38 are Integrated Devices 34, labeled D and E. As suggested above, Integrated Devices D and E could be served by a variety of technologies capable of providing the necessary messaging and connectivity. For example, they may be ISDN devices, or devices served by DSL, cable-TV, fixed wireless, and so on. Further, they could be served by technologies such as DSL, cable-TV, fixed wireless, etc., which utilize an ISDN messaging system.

FIG. 1 also includes LAN connected workstation 30 as Integrated Device H, having an associated analog phone 42, and being connected to its associated central office system by analog phone line 48 which is provisioned with ADSI messaging for conveying the messages of this invention.

Integrated Device 34 labeled C is connected to an office telephone system 40, such as a PBX. Multiplexed access lines 36 having call management messaging system capability 38 extend between Integrated Device C, the office telephone system 40, and the integrated telephone central office system 14. Office telephone system 40 also has an adjunct device 46, such as an automated attendant system, connected to it via a similar multiplexed access line 36 having call management messaging system capability 38.

As one example of operation of the call management messaging system, assume that Integrated Device D places a call to Integrated Device E. The call is initiated by Integrated Device D sending a call setup request message on messaging path 38 to its serving integrated telephone central office system 14; the call setup request message contains the calling device's IP address and the telephone number of the called device. Preferably, the call setup request message also includes the telephone number of the calling device. The messaging channel internal to the integrated telephone central office system 14 distributes the call setup message within the system to all available system elements, whereupon it is processed by the appropriate element or elements. In processing the call setup message, the serving integrated telephone central office system 14, by referring to its records system 18, determines that the called telephone number is served by a remote telephone central office, and forwards the call setup message to the long distance telephone central office 24 via the SS7 messaging path 22 for delivery to the remote telephone central office. The long distance telephone central office 24 in turn determines that the called telephone number is served by the telephone central office on the right of the drawing, and forwards the call setup request message to it via the SS7 messaging path 22.

The call setup request message is received by the integrated telephone central office system serving E, which determines by referring to its records system 18 that the called device is an Integrated Device capable of creating an Internet connection, and capable of corresponding with the call management messaging system. Also from its records system 18, the integrated telephone central office system determines the messaging address and any necessary internal routing information to deliver messages to Integrated Device E, and forwards the call setup message to it via the integrated telephone central office system internal messaging channel, and messaging path 38.

If Integrated Device E is busy, that is, it has inadequate call-handling resources available to accept another call, it will reject the call setup request by responding either with a busy message or a call forwarding message to its serving integrated telephone central office system. In the case of a busy message, the integrated telephone central office system serving E will forward the message to the calling Integrated Device D via an appropriate route such as the reverse of the path followed by the call setup request message. Integrated Device D, upon receiving the busy message will supply notification to the user of D that the called device was busy, such as by an audible busy signal.

In the case of E responding with a call forwarding message, the integrated telephone central office system serving E will examine the message to determine the telephone number the call is being forwarded to. By referring to its records system 18 it will determine if it also serves the forwarded telephone number. If not, it will send the call forwarding message on to the appropriate serving integrated telephone central office or long distance telephone central office via the SS7 messaging system. For this example, presume that E forwards the call to analog telephone G, served by the same integrated telephone central office. By examining its records system 18, the integrated telephone central office system determines that the called telephone number is an analog device which is not capable of creating an Internet connection, and which is not capable of corresponding with the call management messaging system. The integrated telephone central office system further determines if G is busy or able to accept an incoming call. If G is busy, the integrated telephone central office system creates a busy message and sends it to D, as before. If G is able to accept an incoming call, the integrated telephone central office system activates ringing for G, and sends a call forwarded message and an audible ring back message to D, which might be a single message. The call forwarded message announces the forwarded telephone number to D, and the audible ring back message causes D to initiate "pacifier ring" to the user of D as notification that ringing has begun at the called telephone.

If the user at G answers the call, the serving integrated telephone central office system initiates an analog call connect message to D which includes any necessary circuit connection information being assigned to the call. Intervening systems process and respond accordingly in establishing circuit connections and providing circuit connection information to the call-handling systems that they connect to, adding that information as necessary to the call connect message, or creating associated messages to accompany the call connect message. Upon Integrated Device D receiving an analog call connect message, it turns off audible ring back and connects a voice communications channel to its serving integrated telephone central office system. That system has already received and processed the analog call connect message and assigns the voice communications channel from D to the circuits that it has assigned for the call, and an analog connection is made between D and G.

Another example drawn from this illustration has any one of C, D, or E calling ADSI device H. In this circumstance a call setup request message is initiated by the calling device, perhaps in ISDN format, transported across the messaging system between PSTN central offices, perhaps that messaging system being the SS7 network or the Internet, and then delivered to the called device H in ADSI format. Obviously, then, the messaging system of this invention is capable of existing and operating in multiple modes concurrently, and of translating similar messages from one mode to another as may be necessary to provide an end-to-end messaging capability across and between dissimilar systems and networks.

Figure 2:
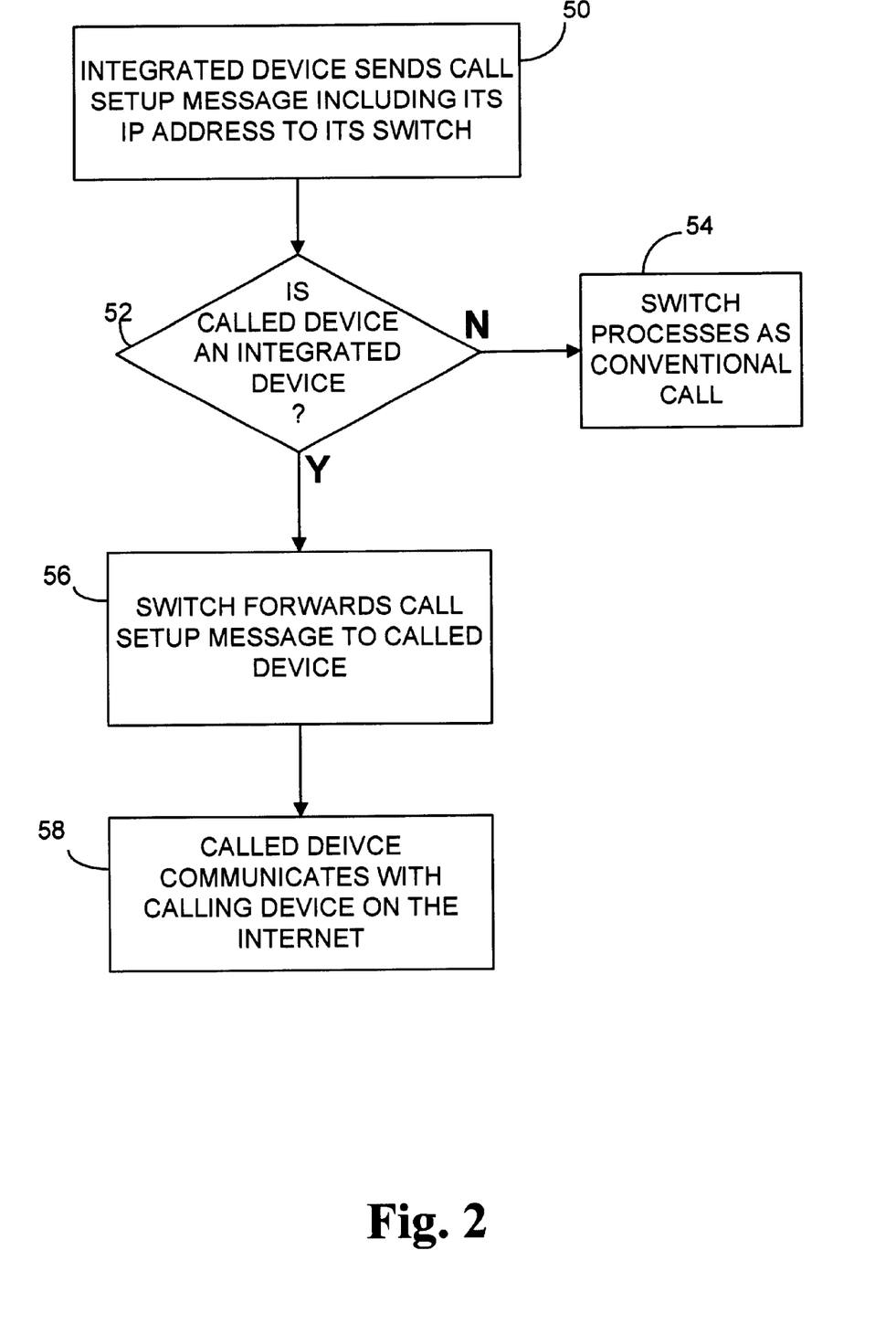
FIG. 2 is a flow chart depicting the process steps for creating an Internet communication in an environment that includes analog devices.

FIG. 2 illustrates the major steps of this process. At 50 an Integrated Device sends a call setup message incorporating its own IP address to its serving telephone central office system. By referring to its records system for the called telephone number contained in the call setup message the telephone central office system at 52 determines if the called device is an Integrated Device. If the called device is not an Integrated Device, the telephone central office system at 54 processes the call setup request as an analog telephone call. However, if the called device is an Integrated Device, the telephone central office system at 56 forwards the call setup message to the called device. The called device at 58, now having the IP address of the calling device, communicates with the calling device over the Internet.

Figure 3:
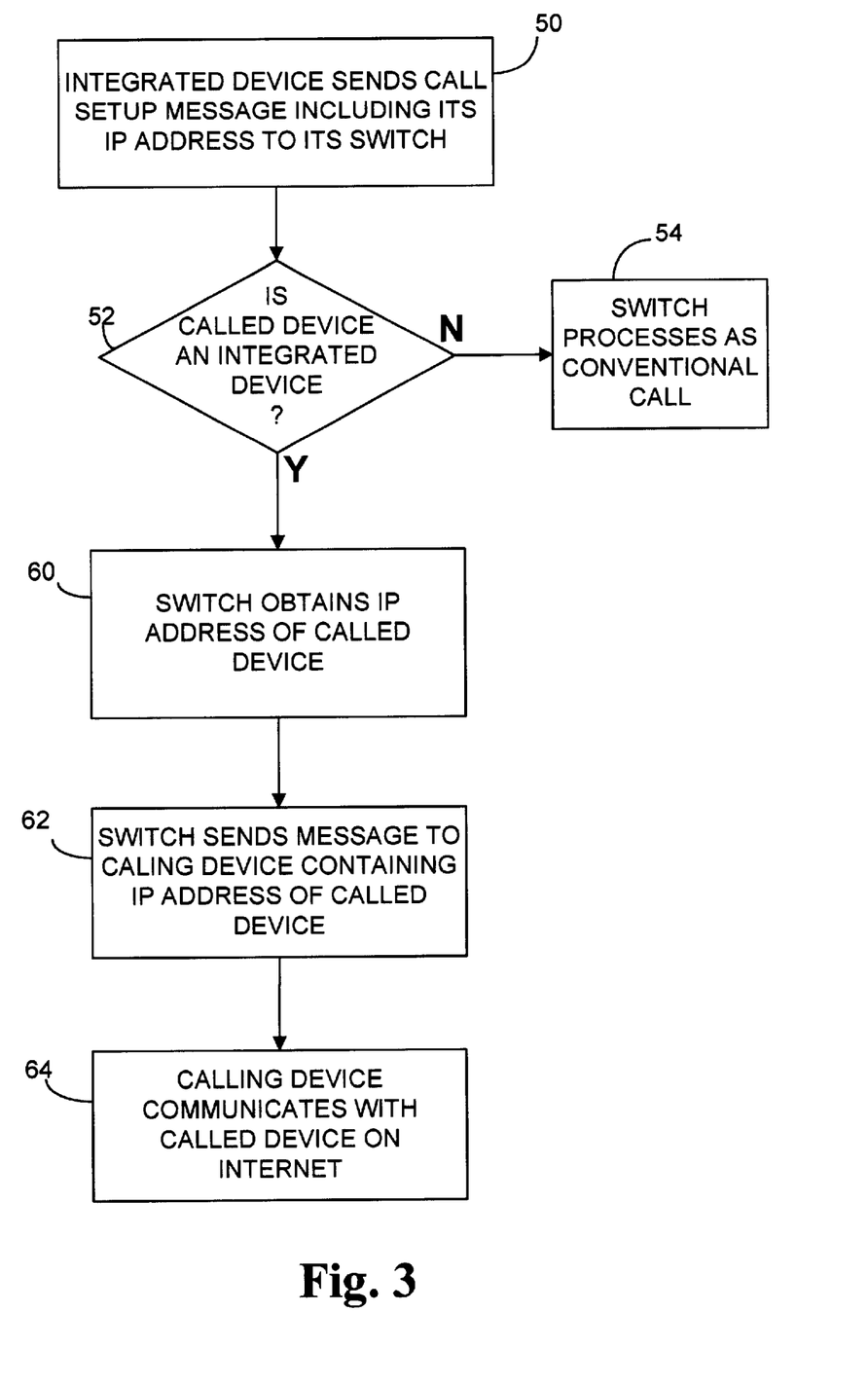
FIG. 3 is a flow chart depicting a variation of the process shown by FIG. 2 for creating an Internet communication in an environment that includes analog devices.

In FIG. 3 there is depicted a variation of the process shown in FIG. 2. Steps 50, 52, and 54 take place as before. However, in the FIG. 3 variation, if the called device is an Integrated Device the telephone central office system at 60 obtains the IP address of the called device by referring to its records system, and then at 62 the telephone central office system sends that IP address to the calling device. The calling device at 64, now having the IP address of the called device, communicates directly with the called device over the Internet. Since this invention specifies that call management messages may be the same for sending over the Internet as for the PSTN, the communication of 64 may be a call setup request message sent directly from the calling to the called device on the Internet. It will be understood that the circumstance of either FIG. 2 or FIG. 3 could be extended to have the PSTN send equivalent IP address messages to both devices.

In the above fashion, the call setup request that would have created a multimedia communications over the Internet is backwardly compatible with the analog infrastructure of the PSTN, and automatically defaults to an analog telephone call when necessary. Thus the call management messaging system seamlessly integrates the Internet with the PSTN.

Figure 4:
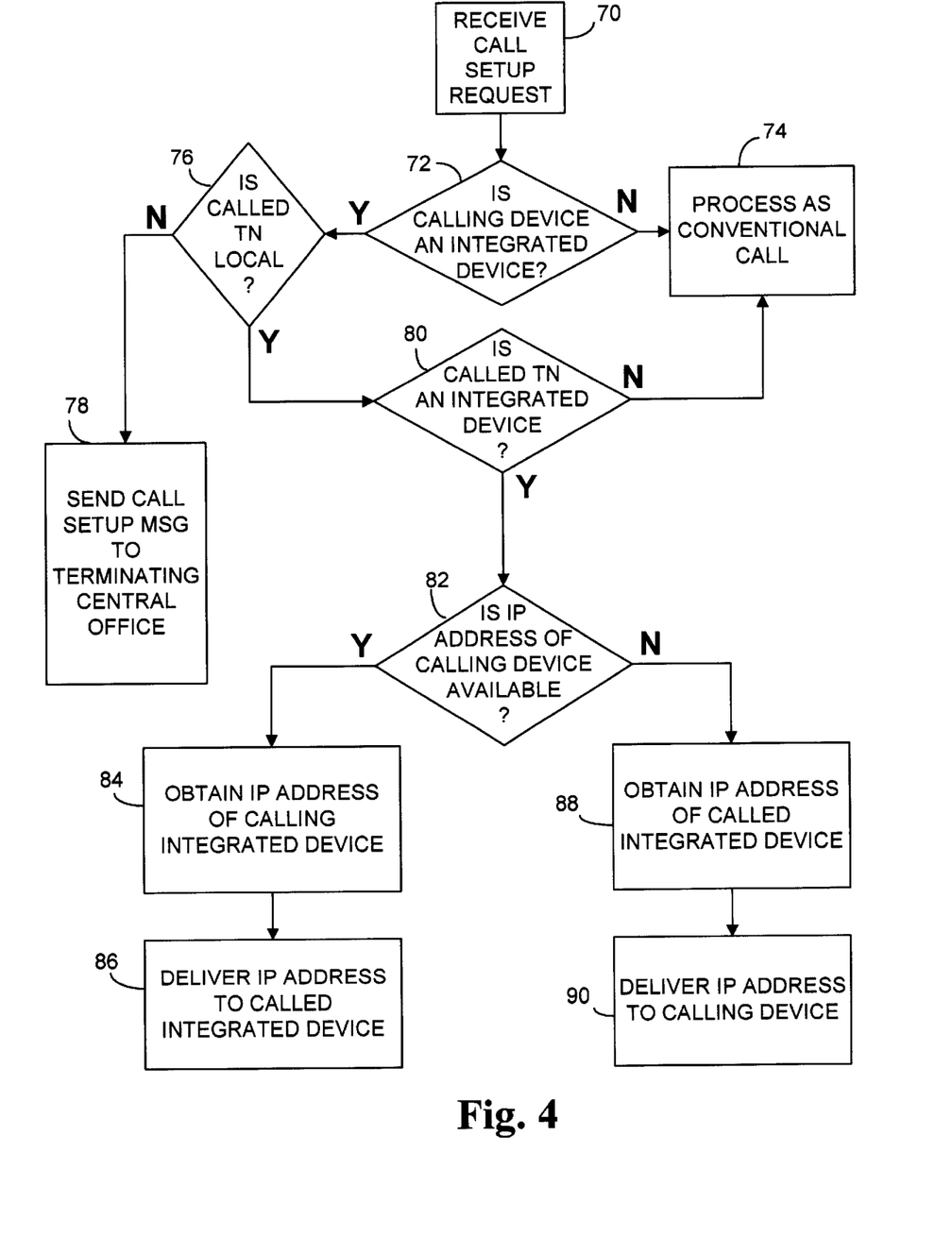
FIG. 4 depicts a logic flow chart of the processes involved for a switching system to handle a call setup request in an integrated Internet/PSTN environment.

Next described is a generic method of operation of a telephone central office switching system for a preferred embodiment of the invention. The key operation is for the telephone central office switching system to obtain the IP address of one of the calling and called devices, and deliver that IP address to the other of the calling and called devices. FIG. 4 provides a logical flow chart of the processes involved for a switching system to handle a call setup request in an integrated Internet/PSTN environment. Referring to FIG. 4, the switching system at 70 receives a call setup request directly from a device or indirectly via a calling device, an interface device, or a remote central office switching system. The switching system 72 via the call setup request message or via records information determines if the calling phone is an Integrated Device. If it is not, the call is processed as an analog phone call at 74. If it is an Integrated Device, the switching system, via internal records, determines at 76 if the called telephone number is served locally by the switching system. If it is not served by the local switching system, the call setup request is forwarded at 78 in the form of a digital message via the SS7 network to the terminating central office switching system for processing. If the called device is locally served, then at 80 the switching system, via internal records, determines if the called TN is an Integrated Device. If not, the switching system processes the call at 74 as an analog phone call. However, if the called device is an Integrated Device, then at 82 the switching system determines if the IP address of the calling device is available via one of the arrangements previously discussed. Perhaps, for example, the IP address is included in the call setup message from the calling device. If it is available, the switching system at 84 obtains the IP address of the calling device, and at 86 sends the IP address in a call setup message to the called device, whereupon the calling and called devices can commence communication over the Internet. If, however, the IP address of the calling device is not available, then at 88 the switching system obtains the IP address of the called Integrated Device, and at 90 sends the IP address in a call setup message to the calling device, whereupon the calling and called devices can commence communication over the Internet.

Similar examples to those described previously could be created in which Integrated Device C was either the calling or the called device. The distinguishing characteristic of those examples is that PBX 40 acts as an intermediary system, receiving, forwarding, and appropriately modifying call management messages sent to or from C, and directing those messages across message path 38 either to C or to the integrated telephone central office system 14. In a case where C does not have a direct dial telephone number, instead having an extension number off the PBX, an incoming call might be routed to an adjunct system 46 such as an automated attendant system ("if you know the number of the party you are calling, please dial it now . . . "). In this arrangement, the messaging path 38 carries a call setup message to the automated attendant system for handling in lieu of delivering it directly to C.

A variation of the methods of FIGS. 2 and 3 is enabled by capabilities of the PSTN such as ISDN Q.931 user-to-user messaging, which provides the ability of a calling and called device to directly communicate across the PSTN. In this variation, a calling device such as D may send a call setup request message across the PSTN, such as via the messaging links 22 of FIG. 1, to a called device such as E for purposes of creating an Internet communication, wherein the call setup request message incorporates the IP address of D. Integrated Device E may then accept the call setup request by responding directly across the Internet to D. The call setup request message from D to E may be in cooperation with conventional call setup processing by the PSTN, or may be independent of such processing. For example, Integrated Device D may first send a conventional call setup request to the PSTN, and, upon that call being established, D sends a message directly to E requesting an Internet communication. Or, optionally, D may send a message requesting an Internet communication directly to E in the absence of a conventional call establishment.

Another example will serve to illustrate the requirement for Integrated Devices to manage their own call-handling resources in an integrated Internet and PSTN environment. Presume that Integrated Device E, in addition to being addressable by its telephone number on the PSTN, is also addressable on the Internet such as by a domain name (e.g., www.enzospizza.com). Presume that Internet workstation A is equipped to operate with the call management messaging system for placing voice or multimedia telephone calls over the Internet, and initiates a call to www.enzospizza.com via a suitable software arrangement on the workstation. In the Internet environment, call management system messages are packaged in Internet Protocol (IP) packets, which traverse the Internet in the same fashion as any other IP packets. Although not shown, there would be a facility for workstation A to perform a domain name lookup via a DNS (Domain Name Service) server which would translate the alphabetic name of www.enzospizza.com to a numeric IP address (i.e., xxx.xxx.xxx.xxx). Workstation A then sends a call setup request message to Integrated Device E; the call setup request message contains its own IP address as the "source" and the IP address of E as the "destination". Integrated telephone central office system 14 incorporates an internal Internet router function known to the Internet in the standard fashion. Thus, an Internet packet carrying the call setup request message is routed across the Internet, through the router function of the integrated telephone central office system 14, and via the multiplexed access line 36 to Integrated Device E. The path taken by this Internet packet entirely bypasses all PSTN functionality other than the internal router function just referenced.

In this example, since the integrated telephone central office system serving E is unaware of Internet originated calls connected to E, it is not possible for the integrated telephone central office system to manage the call-handling resources of Integrated Device E. The same result occurs in the similar but opposite circumstance wherein Integrated Device E creates direct Internet telephony connections with other Internet devices such as A—the serving integrated telephone central office system for E is unaware of these connections and cannot manage the call-handling resources of Integrated Device E.

However, the procedure of this invention followed in the example of Integrated Device D calling E accommodates this situation by enabling Integrated Devices to manage their own call-handling resources. In that example, Integrated Device E responds to call setup request messages with call acceptance or rejection messages, which gives the called device control over incoming calls. These same messages are applied to the situation of the current example of Internet device A calling Integrated Device E, the difference being that the messages are formulated as Internet Protocol packets and are sent over the Internet (via the router function internal to the integrated telephone central office system) in response to call setup requests being received over the Internet. Thus, in the current example, Integrated Device E responds to the call setup request message from A by sending a call acceptance message or a call rejection message (busy message, or call forwarding message) directly to A over the Internet. As before, a call acceptance message actuates ringing on the called device and audible ring back on the calling device, a busy message actuates a busy signal on the calling device, and so on.

Furthermore, Internet-only devices, such as workstation A, are exposed to the same problem and yield the same benefit from this solution. In another example, assume that workstation A is addressable on the Internet (e.g., it has a domain name such as www.pets.com) and, as before, is equipped to operate with the call management messaging system for placing voice or multimedia telephone calls over the Internet. An unrestricted number of Internet devices (such as B), and Integrated Devices (such as C, D, or E) might attempt to call A at any given time. Using the call acceptance and rejection messages of this invention enables an Internet-only device such as A to manage its own call-handling resources in the same fashion as Integrated Device E in the previous examples by directly sending call acceptance and rejection messages to the calling devices. In the case of a call originating from another Internet-only device such as B, those call handling messages are sent across the Internet directly to the other device, B in this case. In the case of a call originating from a PSTN device such as E, the call handling message is directed to the central office system 14 serving E, or, optionally, to E itself.

In addition to the benefit of Internet-only communications devices and PSTN Integrated Devices being able to manage their own call-handling resources for voice and multimedia calls originating on either the Internet or the PSTN, this invention enables the same messages and messaging system to be used by either type of device to manage calls from either type of device. The call management messaging system is thus a universal messaging solution for the integration of the Internet and the PSTN. This is the preferred embodiment of the present invention.

Having thus described the invention in rather full detail, it will be understood that such detail need not be strictly adhered to, but that further changes and modifications may suggest themselves to one skilled in the art falling within the scope of the present invention as defined by the subjoined claims.

What is claimed is:

1. A call management messaging system for integrating the Internet with the Public Switched Telephone Network (PSTN), comprising:
   (a) call management messages for establishing, disconnecting, and otherwise managing voice and multimedia communications between devices, said messages including Internet Protocol (IP) address information of a calling or called device for enabling said call management messaging system to permit a calling device to establish an internet communication with a called device by dialing its telephone number;
   (b) a plurality of Integrated Devices, each of which has an Internet connection with an associated IP address and a PSTN connection with an associated telephone number, said Integrated Devices being addressable elements of said call management messaging system and being operable to communicate said call management messages;
   (c) a plurality of telephone central office switching systems operable with said call management messaging system; and
   (d) said telephone central office switching systems communicating said call management messages with said Integrated Devices.

2. A call management messaging system for integrating the Internet with the PSTN as recited by claim 1, further comprising call setup messages, originated by said Integrated Devices, incorporating a called telephone number and an IP address of a calling Integrated Device.

3. A call management messaging system for integrating the Internet with the PSTN as recited in claim 1, further comprising:
   (a) a plurality of Internet communications devices operable with said call management messaging system; and
   (b) said Internet communications devices communicating said call management messages with said Integrated Devices via the Internet.

4. A call management messaging system for integrating the Internet with the PSTN as recited by claim 3, further comprising call setup messages, originated by said Internet communications devices, incorporating a called telephone number and the IP address of the calling device.

5. A call management messaging system as recited by claim 3, wherein said call management messages deliverable on the Internet to an Internet communications device are substantially the same as functionally equivalent messages deliverable on the PSTN to a telephone central office switch.

6. A call management messaging system as recited by claim 3, wherein said call management messages deliverable on the Internet to an Internet communications device are identical to functionally equivalent messages deliverable on the PSTN to a telephone central office switch.

7. A call management messaging system as recited by claim 3, wherein said call management messages deliverable on the Internet to an Internet communications device are identical to functionally equivalent messages deliverable on the PSTN to a telephone central office switch other than for packetization necessary to transport said messages across the Internet.

8. A call management messaging system for integrating the Internet with the PSTN as recited by claim 1, further comprising:
   (a) telephone central office switching system interface devices, including those providing Voice over IP (VoIP), DSL access, cable-TV access, and fixed wireless access, which provide Internet and telephony services to client devices by providing an interface to the switching system for its client devices, said interface devices being adapted to provide Internet and telephony services for said Integrated Devices, and being operable with said call management messaging system; and
   (b) said telephone central office switching system interface devices communicating said call management messages with said client devices to include Integrated Devices.

9. A call management messaging system for integrating the Internet with the PSTN as recited by claim 1, further comprising:
   (a) a plurality of telephone long distance central office switching systems adapted to be operable with said call management messaging system; and
   (b) said telephone long distance central office switching systems communicating said call management messages with local telephone central office-switching systems serving said Integrated Devices.

10. A call management messaging system for integrating the Internet with the PSTN as recited by claim 1, further comprising:
    (a) a plurality of office telephone systems including PBXs and Key Systems which provide services for Integrated Devices and are operable with said call management messaging system;
    (b) said office telephone systems communicating said call management messages with said Integrated Devices; and
    (c) said office telephone systems communicating said call management messages with said telephone central office switching systems serving said office telephone systems.

11. A call management messaging system for integrating the Internet with the PSTN as recited by claim 1, further comprising:
    (a) a plurality of adjunct devices including automated attendant systems, voice mail systems, and automatic call distributors adapted to be operable with said call management messaging system; and
    (b) said adjunct devices communicating said call management messages with other devices and systems associated with said call management messaging system.

12. A call management messaging system for integrating the Internet with the PSTN as recited by claim 1, further comprising:
    (a) one or more cross-reference sources for maintaining IP addresses of Integrated Devices, each of said IP addresses being associated with an identifier such as a telephone number of one of said Integrated Devices;
    (b) said cross-reference sources being operable with said call management messaging system;
    (c) query messages for supplying said cross-reference sources with identifiers such as a telephone number of said Integrated Device; and
    (d) said cross-reference sources being respondent to said query messages with response messages containing an IP address of the identified Integrated Device.

13. A call management messaging system for integrating the Internet with the PSTN as recited by claim 1, wherein said call management messages are delivered on the PSTN to and among elements of the PSTN, said elements including Integrated Devices, telephone central office switching systems, telephone central office switching system interface devices, telephone long distance central office switching systems, and office telephone systems including PBXs and Key Systems, said telephone central office switching system interface devices providing Internet and telephony services to client devices by providing an interface to the switching system for its client devices.

14. A call management messaging system as recited by claim 1, wherein said call management messages are carried on the PSTN by the SS7 messaging system.

15. A call management messaging system as recited by claim 1, wherein said call management messages are formatted according to an X.25 communications protocol for transport by a PSTN SS7 messaging system.

16. A call management messaging system as recited by claim 1, wherein said call management messages are transported on the Internet between elements of the PSTN.

17. A call management messaging system as recited by claim 1, wherein said call management messages are formatted according to Integrated Services Digital Network (ISDN) standards as extensions of an ISDN messaging system.

18. A call management messaging system as recited by claim 1, wherein said call management messages are identical to functionally equivalent ISDN-formatted messages, other than for packetization necessary to transport said messages across the Internet.

19. A call management messaging system as recited by claim 1, wherein said call management messages are formatted according to Asynchronous Display Screen Interface (ADSI) standards.

20. A call management messaging system as recited by claim 1, wherein said call management messages are communicated between Integrated Devices, such as by ISDN Q.931 messaging capabilities, said communication being transported by the PSTN.

21. A call management messaging system for integrating the Public Switched Telephone Network (PSTN) with other networks, comprising:
 (a) call management messages for establishing, disconnecting, and otherwise managing voice and multimedia communications between devices, said messages including Internet Protocol (IP) address information of a calling or called device, for enabling said call management messaging system to permit a calling device to establish an Internet communication with a called device by dialing its telephone number;
 (b) a plurality of Integrated Devices, each of which has a connection on said other network with an associated messaging address and has a PSTN connection with an associated telephone number, and is an addressable element of said call management messaging system operable to communicate said call management messages;
 (c) a plurality of telephone central office switching systems being operable with said call management messaging system and having said Integrated Devices as clients;
 (d) said telephone central office switching systems communicating said call management messages with said client Integrated Devices;
 (e) other network communications devices being addressable elements of said call management messaging system and being operable with said call management messaging system; and
 (f) said other network communications devices communicating said call management messages with said Integrated Devices via said other network.

22. A method for operating a call management messaging system to integrate the Internet with the Public Switched Telephone Network (PSTN) wherein an Integrated Device, being an addressable element of said call management messaging system and operable to send and receive said call management messages, and having both an Internet connection with an associated IP address and a PSTN connection with an associated telephone number, manages its own call-handling resources in response to call setup request messages by responding with call management messages for accepting, rejecting, and otherwise managing call setup requests between communications devices and systems, comprising the steps of:
 (a) sending call setup request messages to said Integrated Devices via the Internet by Internet communications devices operable with said call management messaging system;
 (b) sending call setup request messages by Integrated Devices to other Integrated Devices via telephone central office switching systems on the PSTN;
 (c) accepting call setup requests from said Internet communications devices by a called Integrated Device sending call acceptance messages to said Internet communications devices via the Internet when said called Integrated Device has adequate call-handling resources;
 (d) rejecting call setup requests from said Internet communications devices by a called Integrated Device sending call rejection messages to said Internet communications devices via the Internet when said called Integrated Device has inadequate call-handling resources;
 (e) accepting call setup requests from said telephone central office switching systems by a called Integrated Device sending said call acceptance messages to said telephone central office switching systems via the PSTN when said called Integrated Device has adequate call-handling resources; and
 (f) rejecting call setup requests from said telephone central office switching systems by a called Integrated Device sending said call rejection messages to said telephone central office switching systems via the PSTN when said called Integrated Device has inadequate call-handling resources.

23. A method for operating a call management messaging system as recited by claim 22, wherein said Integrated Device rejects call setup requests due to lack of available call-handling resources, and said call rejection message for rejecting call setup requests is either a busy message or a call forwarding message.

24. A method for operating a call management messaging system, wherein an Internet communications device, being an addressable element of said call management messaging system and operable to send and receive said call management messages, manages its own call-handling resources in response to call setup request messages by responding with call management messages for accepting, rejecting, and otherwise managing call setup requests between communications devices and systems, comprising the steps of:
 (a) sending call setup request messages from Internet communications devices operable with said call management messaging system to other of said Internet communications devices via the Internet;

(b) sending call setup request messages from Integrated Devices to Internet communications devices via the Internet, said Integrated Devices having both an Internet connection with an associated IP address and a PSTN connection with an associated telephone number, and being operable with said call management messaging system;

(c) accepting call setup requests from other of said Internet communications devices by sending said call acceptance messages from said Internet communications devices to said other Internet communications devices via the Internet when said called device has adequate call-handling resources;

(d) rejecting call setup requests from other of said Internet communications devices by sending said call rejection messages from said Internet communications devices to said other Internet communications devices via the Internet when said called device has inadequate call-handling resources;

(e) accepting call setup requests from said Integrated Devices by sending said call acceptance messages from said Internet communications devices to said Integrated Devices via the Internet when said called device has adequate call-handling resources; and (f) rejecting call setup requests from said Integrated Devices by sending said call rejection messages from said Internet communications devices to said Integrated Devices via the Internet when said called device has inadequate call-handling resources.

25. A method for operating a call management messaging system, as recited by claim 24, wherein said Internet device rejects call setup requests due to lack of available call handling resources, and said call rejection message for rejecting call setup requests is either a busy message or a call forwarding message.

26. A method for operating a call management messaging system to integrate the Internet with the PSTN which is compatible with the existing telephony environment, comprising the steps of:

(a) sending a call setup request message from an Integrated Device to its serving telephone central office switching system, said Integrated Device having both an Internet connection with an associated IP address and a PSTN connection with an associated telephone number, and being an addressable element of said call management messaging system operable to communicate said call management messages, said call setup request message containing the IP address of said Integrated Device, and containing the telephone number of a called device;

(b) determining whether the device associated with the called telephone number is an Integrated Device or a traditional telephony device such as an analog device, said determination being made by said serving telephone central office switching system;

(c) forwarding said call setup message from the serving telephone central office switching system to the called device in the event that the called device is an Integrated Device;

(d) sending an Internet message from said called Integrated Device to said calling device, thereby creating an Internet communication with said calling device; and (e) establishing an analog telephone connection between the calling device and the called device, the connection being established by said telephone central office switching system in the event of the called device being an analog device or other traditional telephony device.

27. A method for operating a call management messaging system to integrate the Internet with the PSTN which is compatible with the existing telephony environment, comprising the steps of:

(a) sending a call setup request message from an Integrated Device to its serving telephone central office switching system, said Integrated Device having both an Internet connection with an associated IP address and a PSTN connection with an associated telephone number, and being an addressable element of said call management messaging system and being operable to communicate said call management messages;

(b) determining whether the device associated with the called telephone number is an Integrated Device or a traditional telephony device such as an analog device, said determination being made by said serving telephone central office switching system;

(c) obtaining the IP address of a first one of the calling and called devices in the event that the called device is an Integrated Device, said obtaining step being performed by elements of the PSTN;

(d) sending a message from the serving telephone central office switching system to a second one of the calling and called devices, said message to include the IP address of said first one of the calling and called devices;

(e) sending an Internet message from said second one of the calling and called devices to said first one of said calling and called devices, thereby creating an Internet communication between said calling and called devices; and (f) establishing an analog telephone connection between the calling device and the called device, the connection being established by said telephone central office switching system when the called device is an analog device or other traditional telephony device.

* * * * *